US009999059B2

(12) United States Patent
Cheng et al.

(10) Patent No.: US 9,999,059 B2
(45) Date of Patent: Jun. 12, 2018

(54) SYNCHRONIZATION METHOD AND APPARATUS FOR A WIRELESS WIDE BAND SYSTEM IN AN INTERFERENCE ENVIRONMENT

(71) Applicant: INTERNATIONAL BUSINESS MACHINES CORPORATION, Armonk, NY (US)

(72) Inventors: Xinhao Cheng, Shanghai (CN); Yonghua Lin, Beijing (CN); Jianbin Tang, Doncaster East (AU); Junsong Wang, Beijing (CN); Qing Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 178 days.

(21) Appl. No.: 14/779,995

(22) PCT Filed: Mar. 13, 2014

(86) PCT No.: PCT/CN2014/073359
§ 371 (c)(1),
(2) Date: Sep. 25, 2015

(87) PCT Pub. No.: WO2014/154093
PCT Pub. Date: Oct. 2, 2014

(65) Prior Publication Data
US 2016/0050677 A1    Feb. 18, 2016

(30) Foreign Application Priority Data
Mar. 28, 2013 (CN) .......................... 2013 1 0103976

(51) Int. Cl.
*H04L 12/50* (2006.01)
*H04W 72/08* (2009.01)
(Continued)

(52) U.S. Cl.
CPC ......... *H04W 72/082* (2013.01); *H04W 56/00* (2013.01); *H04W 72/0406* (2013.01)

(58) Field of Classification Search
CPC ................................................ H04W 72/0406
(Continued)

(56) References Cited

U.S. PATENT DOCUMENTS

| 8,169,925 B2 | 5/2012 | Wong et al. |
| 8,340,072 B2 | 12/2012 | Ma et al. |

(Continued)

FOREIGN PATENT DOCUMENTS

| CN | 102598752 A | 7/2012 |
| CN | 102695227 A | 9/2012 |
| CN | 103001678 A | 3/2013 |

OTHER PUBLICATIONS

Kun-Chien Hung, et. al., Joint Detection of Integral Carrier Frequency Offset and Preamble Index in OFDMA WIMAX Downlink Synchronization, Wireless Communications and Networking Conference, 2007, Mar. 11-15, 2007, pp. 1959-1964, IEEE, Washington D.C., USA. <http://ieeexplore.ieee.org/xpl/login.jsp?tp=&arnumber=4224612&url=http%3A%2F%2Fieeexplore.ieee.org%2Fxpls%2Fabs_all.jsp%3Farnumber%3D4224612/>.

*Primary Examiner* — Dang Ton
(74) *Attorney, Agent, or Firm* — Rabin Bhattacharya

(57) ABSTRACT

Synchronization method and apparatus for a wireless wide band system in an interference environment. The method includes: obtaining interference information of a network; selecting at least one channel based at least in part on the interference information; and transmitting resource information through the at least one channel, wherein the resource information indicates a resource allocation determined at least in part on the interference information; and wherein a position of the at least one channel is indicated by a (Continued)

synchronization sequence. The present invention also provides another method and apparatus for synchronization.

9 Claims, 7 Drawing Sheets

(51) Int. Cl.
*H04W 56/00* (2009.01)
*H04W 72/04* (2009.01)

(58) Field of Classification Search
USPC .......................................................... 370/200
See application file for complete search history.

(56) References Cited

U.S. PATENT DOCUMENTS

| | | |
|---|---|---|
| 2009/0067377 A1 | 3/2009 | Talukdar et al. |
| 2010/0027694 A1 | 2/2010 | Touboul et al. |
| 2010/0165942 A1 | 7/2010 | Liao et al. |
| 2011/0007831 A1 | 1/2011 | Moon et al. |
| 2011/0190024 A1 | 8/2011 | Seong et al. |
| 2011/0200126 A1* | 8/2011 | Bontu ................. H04L 25/0232 375/260 |
| 2012/0140683 A1 | 6/2012 | Xu et al. |

* cited by examiner

SYNCHRONIZATION METHOD AND APPARATUS FOR A WIRELESS WIDE BAND SYSTEM IN AN INTERFERENCE ENVIRONMENT

CROSS-REFERENCE TO RELATED APPLICATION

This application claims priority under 35 U.S.C. § 371 from PCT Application PCT/CN2014/073359, filed on Mar. 13, 2014, which claims priority from Chinese Patent Application No. 201310103976.7, filed Mar. 28, 2013. The entire contents of both applications are incorporated herein by reference.

TECHNICAL FIELD OF THE INVENTION

The present invention relates to wireless communications, and more specifically, to a synchronization method and apparatus for a wireless wide band system in an interference environment.

BACKGROUND OF THE INVENTION

Currently, lots of different wireless communication networks coexist, such as Global System for Mobile communication (GSM)/Code Division Multiple Access (CDMA)/Long Term Evolution (LTE)/Wireless Fidelity (WiFi)/Worldwide Interoperability for Microwave Access (WiMAX) and so on. In many areas in the communication industry, there are still some legacy analog wireless systems, which occupied the best frequency bands but with very low spectral efficiency.

Since these legacy wireless systems usually have a very narrow frequency bandwidth and the data rates are also very low, it is possible and valuable to build a new wide band system to share spectra of these legacy wireless systems. However, for the new wide band system, all in-band signals coming from legacy heterogeneous systems would be treated as interference signals.

Most of the narrowband signals are very strong in terms of power spectrum density, and traditional wireless systems do not work well because of lacking interference resistance capabilities. In particular, with the presence of strong interferences from a heterogeneous network on a synchronization channel, the synchronization of a wide band system might be greatly impacted, thereby reducing the system performance. Therefore, it will be a big challenge to make the wide band signal to coexist with the strong legacy signal.

SUMMARY OF THE INVENTION

According to a first aspect of the invention, there is provided a method for synchronization. The method includes: obtaining interference information of a network; selecting at least one channel based at least in part on the interference information; and transmitting resource information through the at least one channel, wherein the resource information indicates a resource allocation determined based at least in part on the interference information; and wherein a position of the at least one channel is indicated by a synchronization sequence.

According to a second aspect of the invention, there is provided an apparatus for synchronization. The apparatus includes: an obtaining unit configured to obtain interference information of a network; and a selecting unit configured to select at least one channel based at least in part on the interference information; and a transmitting unit configured to transmit resource information through the at least one channel, wherein the resource information indicates a resource allocation determined based at least in part on the interference information, and wherein a position of the at least one channel is indicated by a synchronization sequence.

According to a third aspect of the invention, there is provided a method for synchronization. The method includes: detecting a synchronization sequence, wherein the synchronization sequence indicates a position of at least one channel selected based at least in part on interference information of a network; and decoding the at least one channel to obtain resource information transmitted through the at least one channel, wherein the resource information indicates a resource allocation determined based at least in part on the interference information.

According to a fourth aspect of the invention, there is provided an apparatus for synchronization. The apparatus includes: a detecting unit configured to detect a synchronization sequence, wherein the synchronization sequence indicates a position of at least one channel selected based at least in part on interference information of a network; and a decoding unit configured to decode the at least one channel to obtain resource information transmitted through the at least one channel, wherein the resource information indicates a resource allocation determined based at least in part on the interference information.

BRIEF DESCRIPTION OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

DETAILED DESCRIPTION OF THE PREFERRED EMBODIMENTS

Figure 1:
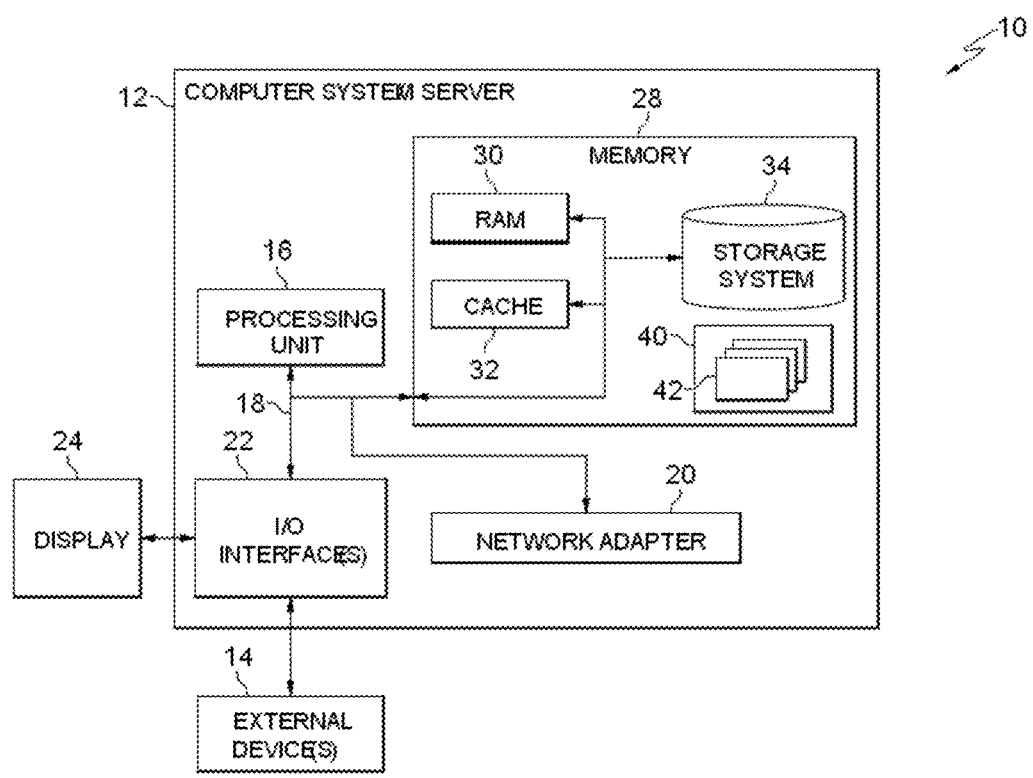
FIG. 1 shows a block diagram of an exemplary computer system/server 12 which is applicable to implement the embodiments of the present invention.

Some preferable embodiments will be described in more detail with reference to the accompanying drawings, in which the preferable embodiments of the present invention have been illustrated. However, the present invention can be implemented in various manners, and thus should not be construed to be limited to the embodiments disclosed herein. On the contrary, those embodiments are provided for the thorough and complete understanding of the present invention, and completely conveying the scope of the present invention to those skilled in the art.

Aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, an electronic, magnetic, optical, electromagnetic, infrared, or semiconductor system, apparatus, or device, or any suitable combination of the foregoing. More specific examples of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As shown in FIG. 1, computer system/server 12 is shown in the form of a general-purpose computing device. The components of computer system/server 12 can include, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include: microcode, device drivers, redundant processing units, external disk drive arrays, RAID systems, tape drives, and data archival storage systems, etc.

Coexistence of lots of different wireless communication networks such as GSM/CDMA/LTE/WiFi/WiMAX and so on leads to problems in synchronization of current systems. In a LTE network, Primary Synchronization Signal (PSS), Cyclical Prefix (CP), Secondary Synchronization Signal (SSS) and Broadcasting CHannel (BCH) are used in the synchronization. PSS, SSS and BCH are located in a fixed and relatively narrow frequency band to guarantee that a terminal supporting a different bandwidth (i.e. 1.4 MHz, 3 MHz, 5 MHz, 10 MHz and 20 MHz) can use the same synchronized method which is more efficient and eliminates a fussy search for a different bandwidth. However, to save the bandwidth, only very small resources were allocated to PSS, SSS and BCH. For example, both PSS and SSS only use 62 subcarriers, while BCH only uses 72 subcarriers. The small resources make LTE synchronization very vulnerable to interferences. For example, a large part of subcarriers used by PSS and SSS are most likely to experience unexpected narrowband interferences. If there are strong interferences located in the PSS/SSS/BCH band, LTE synchronization would not work. WiMAX (IEEE 802.16e) system uses a much longer preamble and has a capability to resist much stronger interferences than LTE. After a terminal is synchronized successfully with the preamble, the terminal will try to decode Frame Control Header (FCH) according to a segment ID derived from the preamble's index. However, WiMAX system also has some problems associated with synchronization. For example, the WiMAX synchronization channel fully occupies the spectrum which can bring interferes to other systems. In addition, for each segment, FCH only has 1 fixed position which is not resilient enough to resist the interferences which is randomly distributed. For example, if the strong interference is located in the FCH band, the terminal will fail to decode FCH and could do nothing.

A possible solution is to choose frequency point to avoid interferences. For example, through spectrum sensing, a wireless system could detect a position of the interference and find the best frequency point which could avoid the interference in the synchronization channel. However, due to the variety of interferences, a large frequency point set is needed which causes a heavy burden for a terminal to do the initial synchronization because the terminal has to exhaust the potential frequency points. In addition, since the interferences keep changing their strength and positions, if the synchronization channel is fixed to the same position, it might be disturbed now and then, resulting in a significant impact on the system performance. Moreover, sometimes due to the spectrum planning, the allowed frequency points could be very limited. Hence, a solution to use as less as possible frequency points and adapt the variations of the interferences is desirable.

Figure 2:
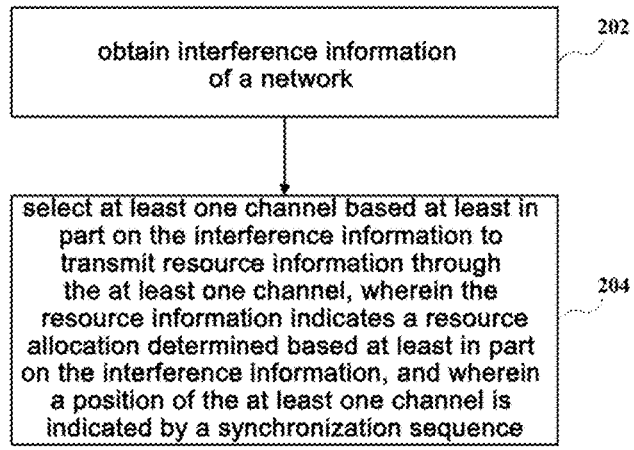
FIG. 2 is a flow chart illustrating a method for synchronization which is executable at a network node in accordance with an exemplary embodiment of the present invention.

With reference now to FIG. 2, which is a flow chart illustrating a method for synchronization executable at a network node in accordance with an exemplary embodiment of the present invention. The network node can be any type of a network side device, for example, it can include: a base station, a Node B, an Evolved Node B (eNB), an Access Point (AP), a control center and the like. As shown in block 202 in FIG. 2, interference information of a network can be obtained at the network node. For example, the network node can acquire the interference information by sensing, and can also communicate with another node or device (such as a database, a server or a memory storing the interference information reported by sensing means) to obtain the up-to-date interference information. According to an exemplary embodiment of the present invention, the network can include: a heterogeneous network, and the interference information indicates the mutual interferences between heterogeneous networks. In order to resist narrow band interferences, the synchronization channel can be selected as wide enough. For example, LTE has 62 subcarriers to work in a clean environment, and hence in the desired system, it is necessary to make at least 62 subcarriers not influenced by the interferences. Furthermore, in order for reducing the interferences to existing legacy systems as much as possible, the synchronization channel can support the puncturing technology. For example, the synchronization channel can be punctured based at least in part on the interference information, so as to remove channel resources (such as subcarriers) conflicting with in-band interferences.

Figure 3:
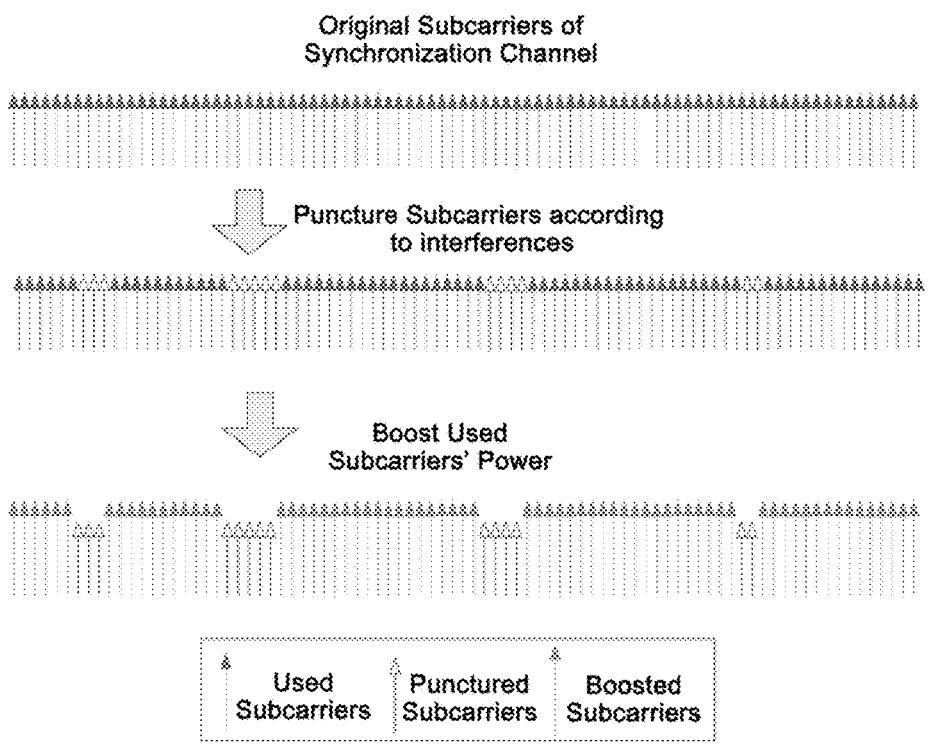
FIG. 3 schematically shows a synchronization channel design in accordance with an exemplary embodiment of the present invention.

FIG. 3 schematically shows a synchronization channel design in accordance with an exemplary embodiment of the present invention, in which a puncturing strategy is introduced. In this example, only 1 Orthogonal Frequency Division Multiplexing (OFDM) symbol is used as the synchronization channel. However, it can be appreciated that this channel design can also be applicable to a situation where multiple OFDM symbols are used such as in a LTE system. As shown in FIG. 3, many factors such as system interferences, network planning and/or the like can be considered in puncturing the synchronization channel to avoid interference collision in the network such as to resist in-band interferences without interfering with the existing legacy system. Thus, original subcarriers of the synchronization channel can include the punched subcarriers shown as hollow arrows in FIG. 3 and the used subcarriers shown as solid arrows aligned with hollow arrows in FIG. 3. According to an exemplary embodiment of the present invention, since the total power used by the synchronization channel before and after puncturing can remain unchanged, the power of subcarriers actually used on the synchronization channel can be improved as denoted by solid arrows higher than hollow arrows in FIG. 3. The boost of power can improve the transmission performance of the system to a certain extent. With respect to the synchronization channel to which the puncturing strategy is applied, an appropriate position can be selected for the corresponding channel (such as a broadcasting channel or FCH channel) in accordance with the method described in FIG. 2.

With reference back to FIG. 2, at least one channel can be selected based at least in part on the obtained interference information to transmit resource information through the at least one channel as shown in block 204. The resource information indicates a resource allocation determined at least in part on the interference information, and wherein a position of the at least one channel is indicated by a synchronization sequence. For example, a channel with interference conflicts (interfering or being interfered) can be set as unavailable, and the at least one channel can be selected from the available channels including one of the broadcasting channels and FCH channels. Alternatively or additionally, the selection of the at least one channel can consider network planning factors. For example, adjacent network nodes (such as base station or AP) using different broadcasting channels or FCH channels. In addition to the resource information, other information such as subchannel bit mapping, encoding indications and the like can also be transmitted through the at least one channel.

According to an exemplary embodiment of the present invention, at least one of the diversity transmission mechanism and the cyclic redundancy check mechanism can be applied to the at least one channel. In the case of applying the diversity transmission mechanism (e.g. repeated transmission), the at least one channel can use multiple opportunities to obtain diversity gains besides the traditional Forward Error Correction (FEC)/Cyclic Redundancy Check (CRC). This means the system could work well provided that at least one opportunity is good enough to decode the at least one channel. In an actual network environment, the system interferences can change at any time. In order to be able to adaptively adjust the system configuration with respect to the change of interferences to effectively avoid interferences and rationally utilize resources, at least one of the following can be adaptively updated at the network node according to the change of the obtained interference information: the position of the at least one channel, and the resource information indicating the resource allocation (e.g. interference positions, available resources, channel mapping relationships or the like).

According to an exemplary embodiment of the present invention, the synchronization sequence indicating the position of the at least one channel can also indicate at least one of a cell and a segment corresponding to the at least one channel. In contrast, the traditional wireless system uses the synchronization sequence to only indicate the cell and the segment. Therefore, according to the solution of the disclosed exemplary embodiments, when the terminal detects the synchronization sequence, in addition to information about the cell and the segment, position information of the used at least one channel selected at the network side can also be acquired. Since the network interference and other factors are considered in the selection of the at least one channel at the network side, the synchronization sequence corresponding to the selected at least one channel can guarantee that the indicated channel is least influenced by interferences.

Figure 4:
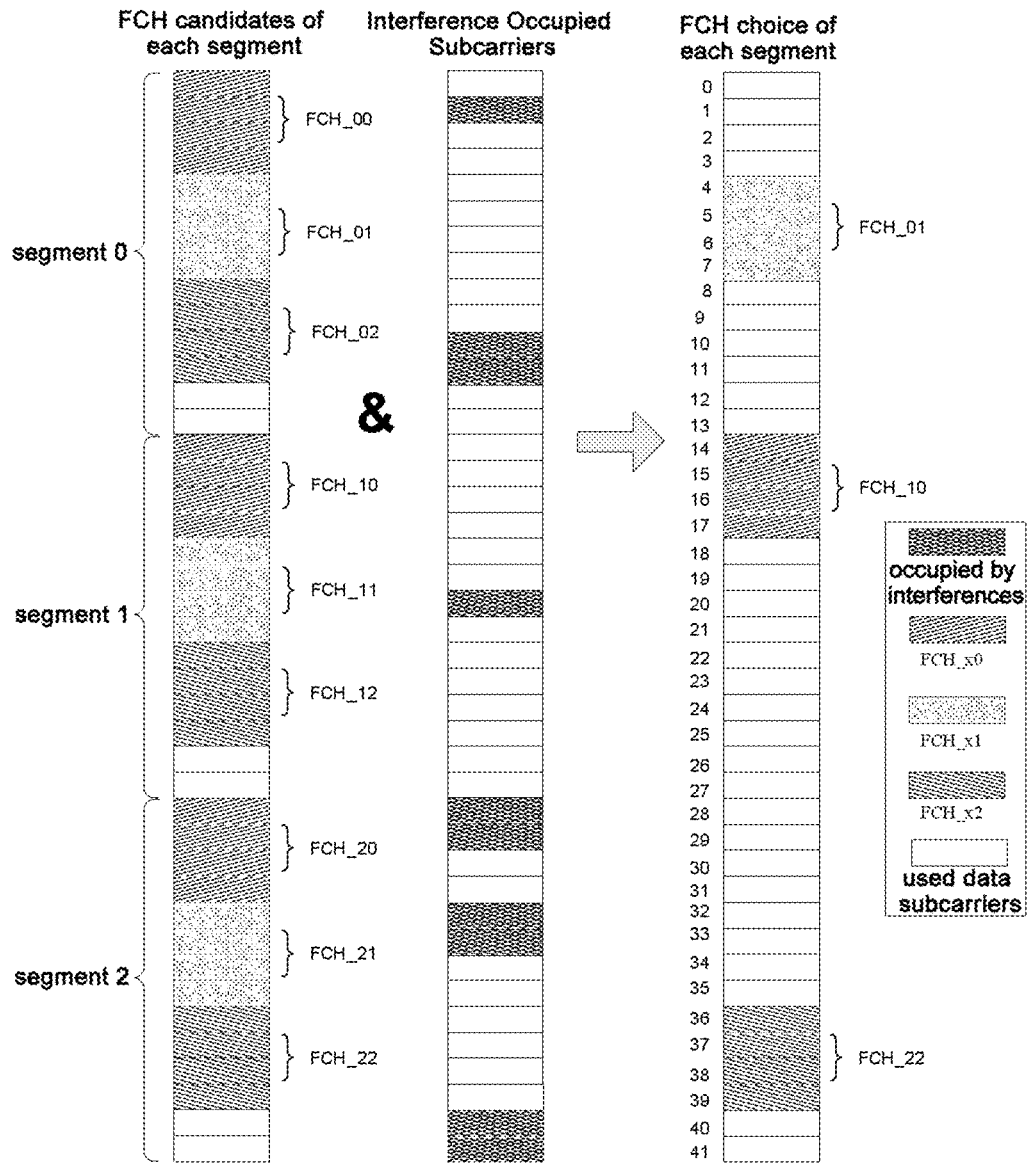
FIG. 4 schematically shows a selection of Frame Control Header (FCH) channel position in accordance with an exemplary embodiment of the present invention.

FIG. 4 schematically shows a selection of FCH channel position in accordance with an exemplary embodiment of the present invention. Although a FCH allocation solution is given here with reference to the WiMAX system, it can be appreciated that a similar broadcasting channel allocation solution can also be applied to other wireless wide band systems such as LTE. For example, the basic principle is to avoid interference conflicts as much as possible. As shown in FIG. 4, candidate FCH channels for segment 0 include FCH_00, FCH_01 and FCH_02, candidate FCH channels for segment 1 include FCH_10, FCH_11 and FCH_12, and candidate FCH channels for segment 2 include FCH_20, FCH_21 and FCH_22. The best FCH channel can be selected based on parameters such as interference positions, network planning and/or the like. In the case of interferences shown in FIG. 4, FCH_01 can be selected for segment 0, FCH_10 can be selected for segment 1, and FCH_22 can be selected for segment 2. Such FCH channel selection results can effectively avoid subcarriers occupied by interferences, improving the system performance. In addition, the repetition mechanism can also be used to resist interferences and introduce diversity gains. For example, the repeated transmission can be conducted for the selected FCH to guarantee at least one successful transmission opportunity to enable the terminal to decode the FCH channel.

According to an exemplary embodiment of the present invention, the corresponding synchronization sequence can be determined according to the selected FCH channel's position, which can also be regarded as a selection of the synchronization sequence, wherein each synchronization sequence can have a corresponding indicator such as a preamble index. Table 1 below shows exemplary relationships between preamble indexes and FCH channel positions.

TABLE 1

| Index | Cell ID | Segment | FCH Start Physical Subchannel |
|---|---|---|---|
| 0 | 0 | 0 | 0 |
| 1 | 1 | 0 | 4 |
| 2 | 2 | 0 | 8 |
| 3 | 3 | 0 | 0 |
| 4 | 4 | 0 | 4 |
| 5 | 5 | 0 | 8 |
| 6 | 6 | 0 | 0 |
| 7 | 7 | 0 | 4 |
| 8 | 8 | 0 | 8 |
| 32 | 0 | 1 | 14 |
| 33 | 1 | 1 | 18 |
| 34 | 2 | 1 | 22 |
| 35 | 3 | 1 | 14 |

TABLE 1-continued

| Index | Cell ID | Segment | FCH Start Physical Subchannel |
|---|---|---|---|
| 36 | 4 | 1 | 18 |
| 37 | 5 | 1 | 22 |
| 38 | 6 | 1 | 14 |
| 39 | 7 | 1 | 18 |
| 40 | 8 | 1 | 22 |
| 64 | 0 | 2 | 28 |
| 65 | 1 | 2 | 32 |
| 66 | 2 | 2 | 36 |

TABLE 2

| Syntax | Size (bit) | Notes |
|---|---|---|
| DL_Frame_Prefix_Format( ) { | | |
| Used subchannel bitmap | 6 | Bit #0: Subchannel group 0 |
| | | Bit #1: Subchannel group 1 |
| | | Bit #2: Subchannel group 2 |
| | | Bit #3: Subchannel group 3 |
| | | Bit #4: Subchannel group 4 |
| | | Bit #5: Subchannel group 5 |
| CRC bit 0 | 1 | CRC bit 0 |
| Repetition_Coding_Indication | 2 | 0b00: No repetition coding on DL-MAP |
| | | 0b01: Repetition coding of 2 used on DL-MAP |
| | | 0b10: Repetition coding of 4 used on DL-MAP |
| | | 0b11: Repetition coding of 6 used on DL-MAP |
| Coding_Indication | 3 | 0b000: CC encoding used on DL-MAP |
| | | 0b001: BTC encoding used on DL-MAP |
| | | 0b010: CTC encoding used on DL-MAP |
| | | 0b011: ZT CC encoding used on DL-MAP |
| | | 0b100: CC encoding with optional interleaver |
| | | 0b101: LDPC encoding used on DL-MAP |
| | | 0b110 to 0b111: Reserved |
| DL-Map_Length | 8 | |
| SubChannel Select Bit | 21 | 1 bit is corresponding to 2 AMC subchannels. |
| | | 1: occupied by Narrow Band Interferences. |
| | | 0: empty. |
| CRC bit 1-7 | 7 | CRC bit 1-7 |
| } | | |

TABLE 1-continued

| Index | Cell ID | Segment | FCH Start Physical Subchannel |
|---|---|---|---|
| 67 | 3 | 2 | 28 |
| 68 | 4 | 2 | 32 |
| 69 | 5 | 2 | 36 |
| 70 | 6 | 2 | 28 |
| 71 | 7 | 2 | 32 |
| 72 | 8 | 2 | 36 |

Table 1 shows the FCH channel selection and the corresponding preamble index selection, and the preamble indexes also correspond to the specified cells and segments. Table 1 merely exemplarily shows non-continuous preamble indexes selected according to the FCH channel positions, however it should be understood, in addition to the selection solution as shown in Table 1, there can be a variety of other FCH and preamble index selection solutions according to some rules similar to that disclosed herein.

Resource information can be transmitted on the at least one channel, including one of a broadcasting channel and a FCH channel, selected according to the method as shown in FIG. 2. The resource information can include a resource allocation indication such as a resource allocation information bit. According to an exemplary embodiment of the present invention, OFDM subcarriers can be divided into n groups, and a resource allocation information bit can be defined in a broadcasting channel or a FCH channel. As an example, n bits are used to identify those n groups, where bit "1" can represent subcarriers "being used", and bit "0" can represent subcarriers "not used". In addition, CRC and diversity schemes such as the repetition mechanism can be used to check correctness of the broadcasting channel or FCH channel transmission. For example, in the WiMAX standard, DL_Frame_Prefix is a data structure transmitted at the beginning of each frame, which contains information about the current frame, and mapped to FCH. FCH can be repeated several times to guarantee successful transmission. Table 2 below gives an exemplary modification to DL_Frame_Prefix for FCH of WiMAX.

According to an exemplary embodiment of the present invention, the modification to the DL_Frame_Prefix data structure can include adding "SubChannel Select Bit" field and "CRC" field as denoted by italics in Table 2. For example, 1 bit in the "SubChannel Select Bit" field can correspond to 2 Adaptive Modulation and Coding (AMC) subchannels, where bit "1" can represent that the channel is occupied by narrow band interferences, and bit "0" can represent that the channel is not occupied by interferences. Therefore, the corresponding interference positions and available resources can be learned from the indication of the "SubChannel Select Bit" field. According to an exemplary embodiment of the present invention, CRC calculation can be the remainder of the division (Modulo 2) by the generator polynomial $g(D)=D^8+D^2+D+1$ of the polynomial $D_8$ multiplied by the content of a FCH message excluding the CRC field. For example, the transmitter can transmit a message m(x), define CRC checkout data as c(x) which include 8 bits, and then let $c(x)=(x^8 m(x)) \% g(x)$, where g(x) is the corresponding generator polynomial. The transmitter can thus transmit m(x) and c(x) together, and the FCH message actually transmitted is t(x)=(m(x), c(x)). Accordingly, the receiver can calculate $t(x) \% g(x)$. If the remainder is 0, then t(x) is transferred correctly, otherwise the t(x) is incorrect. The corresponding CRC checkout data calculation is described exemplarily for the FCH message, and the CRC bit calculation for a particular FCH bit will be further described below exemplarily in combination with FIG. 5.

Figure 5:
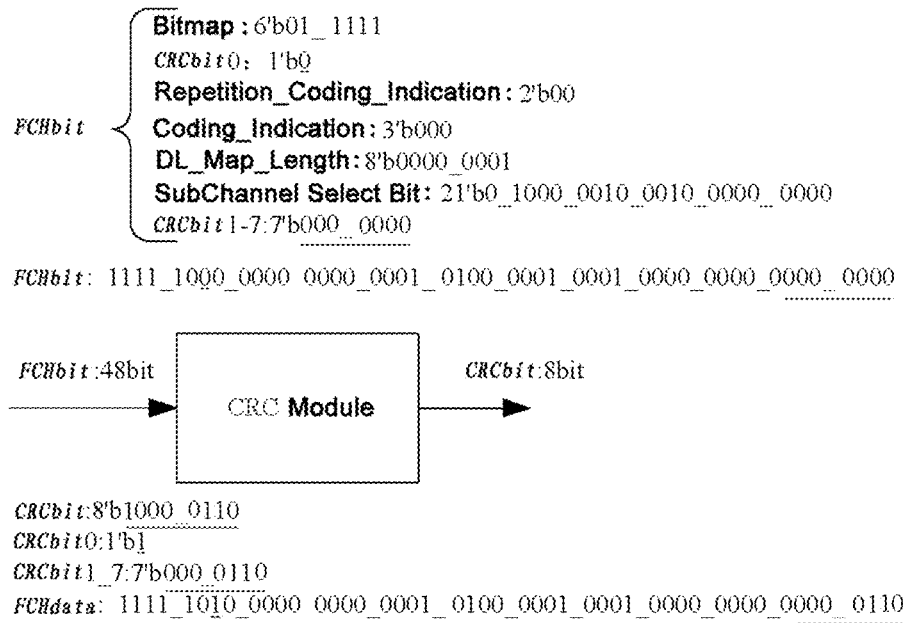
FIG. 5 schematically shows calculations regarding FCH and Cyclic Redundancy Check (CRC) in accordance with an exemplary embodiment of the present invention.

FIG. 5 schematically shows calculations regarding FCH and CRC in accordance with an exemplary embodiment of the present invention. As shown in the upper part of FIG. 5 with CRCbit0=1'b0 and CRCbit1-7=7'b000_0000, the preliminary CRC bit can be defined as CRCbit=8'b0 and the FCH bit (FCHbit in FIG. 5) as 48 bits. Then, the FCHbit can be taken as the input data of a CRC module to get the accurate CRCbit. In the case of correct CRCbit such as CRCbit=8'b1000_0110, FCHbit can be updated correspondingly to obtain the final FCH data as shown in FIG. 5. It should be appreciated that FIG. 5 merely exemplarily presents an optional solution for FCH and CRC bit calculations, and many other schemes can also be suitable to apply the CRC mechanism to a broadcasting channel or a FCH channel.

Figure 6:
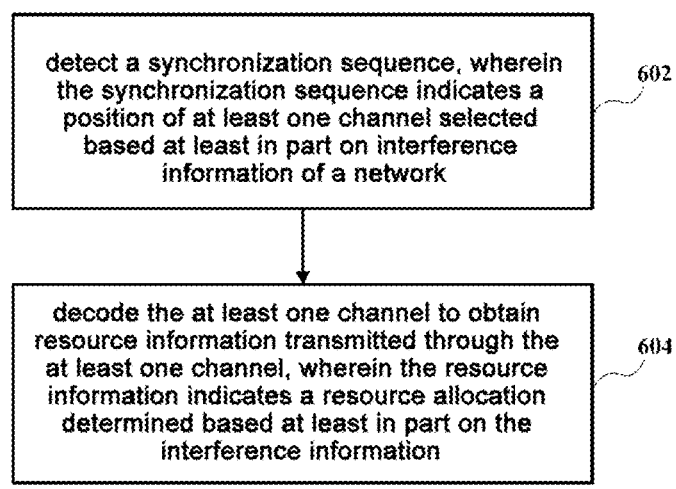
FIG. 6 is a flow chart illustrating a method for synchronization which is executable at a user terminal in accordance with an exemplary embodiment of the present invention.

FIG. 6 is a flow chart illustrating a method for synchronization which is executable at a user terminal in accordance with an exemplary embodiment of the present invention. The terminal can be any type of user device, including: a portable terminal, a radio terminal, a smart phone, a personal digital assistant (PDA), a wireless device, a mobile station, a multimedia tablet, a multimedia player, an imaging device, a laptop, a desktop, a handheld device, or any combination thereof. The process shown in FIG. 6 can be a receiving process corresponding to the transmitting process shown in FIG. 2. As shown in block 602, the terminal can detect a synchronization sequence, wherein the synchronization sequence indicates the position of at least one channel selected based at least in part on interference information of a network. Alternatively or additionally, the synchronization sequence can also indicate at least one of a cell and a segment corresponding to the at least one channel. For example, the at least one channel can include one of a broadcasting channel and a FCH channel, and can apply at least one of a diversity transmission mechanism and a CRC mechanism to the at least one channel. As shown in block 604, the terminal can decode the at least one channel to obtain resources information transmitted through the at least one channel, wherein the resource information indicates a resource allocation determined based at least in part on the interference information. According to an exemplary embodiment of the present invention, the resource information can also indicate data channel mapping relationships from which the terminal can calculate data channel mapping. Thus, the method shown in FIG. 6 provides the terminal with a fast and robust synchronization mechanism for wireless wide band system in an interference environment.

Figure 7:
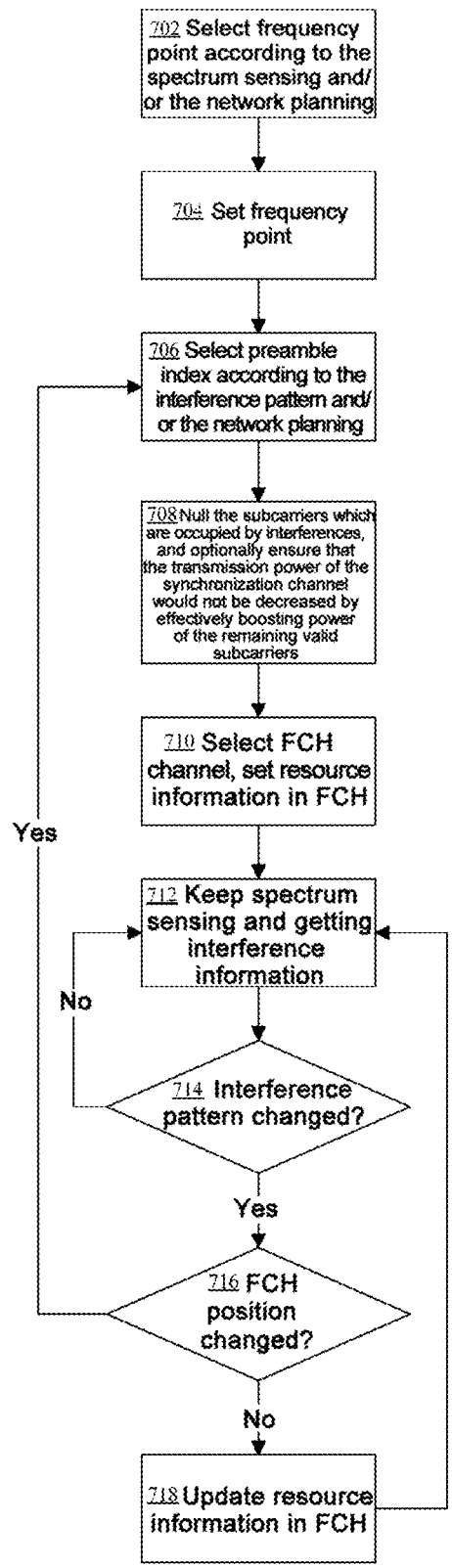
FIG. 7 is a flow chart of transmission at the network side in accordance with an exemplary embodiment of the present invention.

FIG. 7 is a flow chart of transmission at the network side in accordance with an exemplary embodiment of the present invention. For example, the processing flow 700 shown in FIG. 7 can be performed at a base station. Although only the implementation of the flow in the WiMAX system is shown in FIG. 7, a similar processing flow can be applied to other wireless wide band systems such as LTE and the like. As shown in FIG. 7, the base station can select a frequency point according to spectrum sensing and/or network planning in step 702, and set the corresponding frequency point in step 704. In step 706, the base station can select a preamble index according to the interference pattern and/or network planning, so as to indicate the position of the corresponding FCH channel and set subcarriers occupied by interferences as invalid in step 708. Optionally, it can be ensured that the transmission power of the synchronization channel would not be decreased by effectively boosting the power of the remaining valid subcarriers. For example, a channel configuration can be performed according to the method described in combination with FIG. 3 and FIG. 4. In case that the base station selected the preamble index and its corresponding FCH channel, the resource information such as available resources, interfering positions, channel mapping relationships and/or the like can be set in FCH as shown in step 710. Since it is impossible to predict and resist the interference pattern in a heterogeneous network in advance as in a homogeneous network, the base station can keep sensing for spectrum in step 712 to get dynamic interference information. If it is determined in step 714 that there is no change in the interference pattern, then the flow can return to step 712 to continue the spectrum sensing. If it is determined in step 714 that the interference pattern has changed, then the processing flow 700 proceeds to step 716 to determine whether the changed interference pattern influences the selection of the FCH channel. If the change of the interference pattern makes it required to re-select the FCH channel to avoid interference conflicts, then the flow 700 jumps to step 706, where the base station will re-select the preamble index according to the new interference pattern to indicate the new FCH channel position, and accordingly in step 708 set subcarriers in the new interference position as invalid, and then proceeds to subsequent steps. If it is determined in step 716 that the change of the interference pattern does not influence the current selection of the FCH channel (e.g. there is no interference on the currently selected FCH channel), then the processing flow 700 proceeds to step 718 to update the resource information set in FCH with the changed interferences. For example, the indications of interference positions, available resources, channel allocations and the like can need to be adjusted because of the change of the interference pattern. Then, the terminal can keep sensing spectrum as shown in step 712 to obtain the up-to-date interference information.

Figure 8:
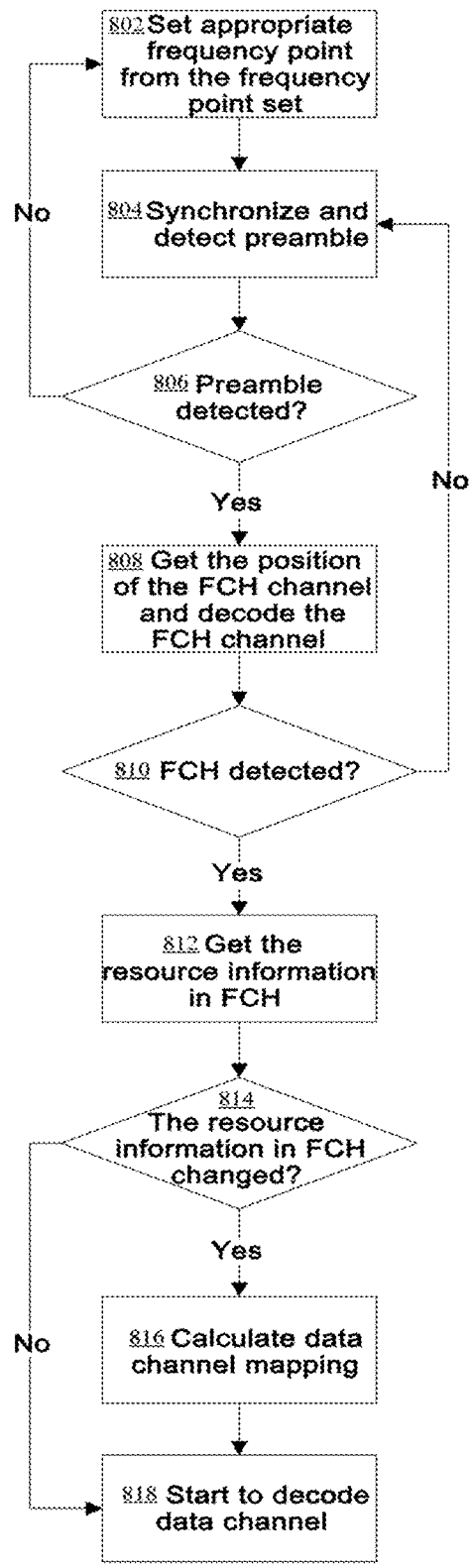
FIG. 8 is a flow chart of reception at the user side in accordance with an exemplary embodiment of the present invention.

FIG. 8 is a flow chart of reception at the user side in accordance with an exemplary embodiment of the present invention. For example, a user can perform flow 800 as shown in FIG. 8 at a terminal device of the user. Although only the implementation of the flow in the WiMAX network terminal is shown here, a similar processing flow can be applied to a terminal for other wireless wide band systems such as LTE. As shown in FIG. 8, the terminal can set an appropriate frequency point in step 802, for example, selecting and setting from the frequency point set one by one. In step 804, the terminal tries to detect and synchronize the preamble from a network such as a base station, and determines in step 806 whether the preamble is detected. If it is determined that the preamble is not detected, then the processing flow 800 will return to step 802 to select an appropriate frequency point. If it is determined that the preamble is detected, then the terminal can obtain the position of the FCH channel in step 808 according to the indication of the detected preamble and decodes the FCH channel. If it is determined in step 810 that the terminal cannot decode and detect the FCH channel, for example, when the decoding of the current FCH channel is influenced because of the change of the interference pattern, then the processing flow 800 will return to step 804, where the terminal can continue to synchronize and detect the preamble. If it is determined in step 810 that the terminal implements the decoding and detection of the FCH channel, then in step 812, the terminal can obtain the resource information transmitted on the FCH channel, so as to determine the resource allocation such as interference positions, available resources, data channels and so on. Considering that the interference pattern in a heterogeneous network is uncertain and unpredictable, the base station can adaptively adjust the design of the synchronization channel and the selection of the broadcasting channel or FCH channel, in accordance with an exemplary embodiment of the present invention. Accordingly, the resource information indicating the resource allocation can updated with the change of interferences. In step 814, the terminal can determine whether the resource information on the FCH channel changes. If the resource information changes, then the terminal can calculate corresponding data channel mapping in step 816. In particular, when the terminal obtains the resource information on the FCH channel for the first time, since the terminal does not have any available resource allocation information from the network, it can be considered that the resource information changed, and the terminal will correspondingly calculate the data channel mapping. If it is determined in step 814 that the resource information is not changed, then the terminal can start to decode the data channel in step 818 according to the data channel mapping previously calculated.

The above methods according to exemplary embodiments of the present invention provide a synchronization system in an interference environment having at least one of the following advantages. The proposed system can resist the in band interferences and would not interfere the existing legacy systems. A terminal in the system can decode the broadcasting channel or FCH channel, which contains more detailed information about interference positions and resource allocations. The system has strong capability to adapt the change of interferences and can recover a synchronization state quickly. For a specific frequency point, the interference position could be anywhere while the wireless system does not have to shift the frequency point to avoid the interference. For example, when interferences change, if FCH is not influenced by the interferences, the base station can update the new resource allocation pattern and broadcast it through the FCH. The terminal could easily track the change of the interferences and the corresponding resource allocations. In the worst case that the FCH is influenced by the interferences, the base station still does not need to change the frequency point, but only needs to switch the FCH's position. To assist new incoming terminals better, the base station would use a new preamble code to indicate the FCH's position. In most cases, because interferences in the heterogeneous network usually appear suddenly, it is impossible in the extreme case to notify the existing terminal of the interferences through the FCH in time. In this case, the existing terminal would lose synchronization, but can re-synchronize to the base station again at the same frequency point. Since the terminal will still use the same frequency point, then a frequency scan can be removed and a lot of time can be saved. In addition, the solution proposed according to exemplary embodiments of the present invention can make the frequency scan time greatly reduced. For example, in case that the total frequency resource is 20 MHz and the bandwidth of a wireless system is 5 MHz, if only frequency shifting is used to avoid the interference of FCH, a high resolution of frequency shifting is required. If the scan step is 250 KHz, there will be 61 frequency points from 2.5 MHz to 17.5 MHz. In contrast, the system provided according to exemplary embodiments of the present invention can use the same frequency point to adapt to any in-band interference without frequency shifting. The whole system can be simply divided into several continuous frequency bands, if the scan step is 5 MHz, in this case there will be only 4 frequency points from 2.5 MHz to 17.5 MHz.

Figure 9:
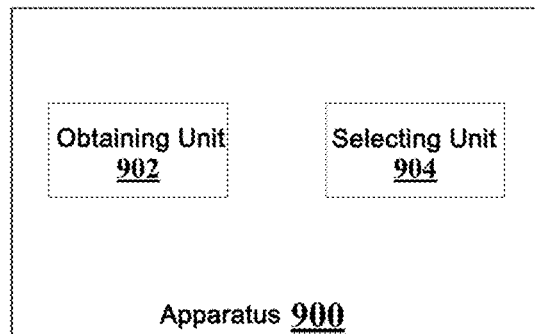
FIG. 9 is a block diagram of an apparatus for synchronization in accordance with an exemplary embodiment of the present invention.

FIG. 9 is a block diagram of an apparatus 900 for synchronization in accordance with an exemplary embodiment of the present invention. The apparatus 900 includes components or units which can implement processing steps and corresponding functions as shown in FIG. 2. As shown in FIG. 9, the apparatus 900 can include an obtaining unit 902 and a selecting unit 904. For example, the obtaining unit 902 can be configured to obtain interference information of a network; and the selecting unit 904 can be configured to select at least one channel based at least in part on the interference information to transmit resource information through the at least one channel, wherein the resource information indicates a resource allocation determined based at least in part on the interference information, and wherein the position of the at least one channel is indicated by a synchronization sequence. The apparatus 900 can be deployed or integrated into a network node such as a base station, an access point, a control center or the like, so that the wireless system synchronization in accordance with exemplary embodiments of the present invention can be implemented in an interference environment.

Figure 10:
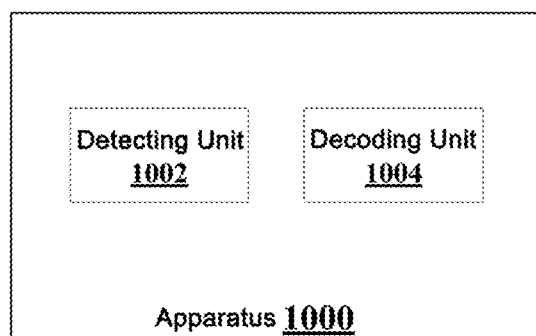
FIG. 10 is a block diagram of another apparatus for synchronization in accordance with an exemplary embodiment of the present invention.

FIG. 10 is a block diagram of another apparatus 1000 for synchronization in accordance with an exemplary embodiment of the present invention. The apparatus 1000 includes components or units which can implement processing steps and corresponding functions as shown in FIG. 6. As shown in FIG. 10, the apparatus 1000 can include a detecting unit 1002 and a decoding unit 1004. For example, the detecting unit 1002 can be configured to detect a synchronization sequence, wherein the synchronization sequence indicates the position of at least one channel selected based at least in part on interference information of a network; and the decoding unit 1004 can be configured to decode the at least one channel to obtain resource information transmitted through the at least one channel, wherein the resource information indicates a resource allocation determined based at least in part on the interference information. The apparatus 1000 can be deployed or integrated into a user terminal such as a mobile station, a radio device, a portable device or the like, so that the wireless system synchronization in accordance with exemplary embodiments of the present invention can be implemented in an interference environment.

The flowchart and block diagrams in the Figs. illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the drawings. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for synchronization, comprising:
   obtaining interference information of a network;
   selecting at least one channel based at least in part on the interference information;
   transmitting resource information through the at least one channel,
   wherein the resource information indicates a resource allocation determined based at least in part on the interference information; and
   wherein the position of the at least one channel is indicated by a synchronization sequence; and
   adaptively updating the position of the at least one channel and the resource information in response to a change of the interference information detected by continuous spectrum sensing.

2. The method of claim 1, wherein at least one of a diversity transmission mechanism and a cyclic redundancy check mechanism is applied to the at least one channel.

3. The method of claim 1, wherein the synchronization sequence further indicates at least one of: a cell and a segment corresponding to the at least one channel.

4. The method of claim 1, wherein the at least one channel comprises: one of a broadcasting channel and a frame control header channel.

5. An apparatus for synchronization, comprising:
   an obtaining unit configured to obtain interference information of a network using spectrum sensing technology;
   a selecting unit configured to select at least one channel based at least in part on the interference information;
   a transmitting unit configured to transmit resource information through the at least one channel,
   wherein the resource information indicates a resource allocation determined based at least in part on the interference information; and
   wherein a position of the at least one channel is indicated by a synchronization sequence; and
   adaptively updating the position of the at least one channel and the resource information in response to a change of the interference information detected by continuous spectrum sensing.

6. The apparatus of claim 5, wherein at least one of a diversity transmission mechanism and a cyclic redundancy check mechanism is applied to the at least one channel.

7. The apparatus of claim 5, wherein the synchronization sequence further indicates at least one of: a cell and a segment corresponding to the at least one channel.

8. The apparatus of claim 5, wherein the at least one channel comprises: one of a broadcasting channel and a frame control header channel.

9. A computer readable non-transitory article of manufacture tangibly embodying computer readable instructions which, when executed, causes a computer to carry out the steps of a method according to claim 1.

* * * * *